(12) United States Patent
Liu et al.

(10) Patent No.: US 12,127,134 B2
(45) Date of Patent: Oct. 22, 2024

(54) SIGNAL SENDING METHOD AND APPARATUS, AND SIGNAL RECEIVING METHOD AND APPARATUS

(71) Applicant: HUAWEI TECHNOLOGIES CO., LTD., Guangdong (CN)

(72) Inventors: Ye Liu, Beijing (CN); Leiming Zhang, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 17/672,477

(22) Filed: Feb. 15, 2022

(65) Prior Publication Data

US 2022/0174613 A1   Jun. 2, 2022

Related U.S. Application Data

(63) Continuation of application No. PCT/CN2019/101204, filed on Aug. 16, 2019.

(51) Int. Cl.
*H04W 52/18* (2009.01)
*H04W 52/24* (2009.01)

(52) U.S. Cl.
CPC .................. *H04W 52/24* (2013.01)

(58) Field of Classification Search
CPC .................................................. H04W 52/24
See application file for complete search history.

(56) References Cited

U.S. PATENT DOCUMENTS

| 8,414,326 B2* | 4/2013 | Bowman | H01R 24/42 439/913 |
| 8,463,191 B2* | 6/2013 | Farajidana | H04B 17/26 455/63.4 |

(Continued)

FOREIGN PATENT DOCUMENTS

| CN | 107734624 A | 2/2018 |
| CN | 107920385 A | 4/2018 |

(Continued)

OTHER PUBLICATIONS

3GPP TS 38.101-1 V16.0.0 (Jun. 2019), "3rd Generation Partnership Project; Technical Specification Group Radio Access Network; NR; User Equipment (UE) radio transmission and reception;Part 1: Range 1 Standalone(Release 16)," Jun. 2019, 268 pages.

(Continued)

*Primary Examiner* — Hai V Nguyen
(74) *Attorney, Agent, or Firm* — Fish & Richardson P.C.

(57) ABSTRACT

Example signal sending methods and apparatus are described. One example method includes obtaining a first insertion loss corresponding to a first resource and a second insertion loss corresponding to a second resource, where the first insertion loss is different from the second insertion loss. A first transmit power corresponding to the first resource is determined based on the first insertion loss. A second transmit power corresponding to the second resource is determined based on the second insertion loss. A first signal is sent on the first resource based on the first transmit power. A second signal is sent on the second resource based on the second transmit power.

15 Claims, 5 Drawing Sheets

(56) References Cited

U.S. PATENT DOCUMENTS

| | | | |
|---|---|---|---|
| 8,958,838 B2* | 2/2015 | Patel | H04W 52/247 455/67.11 |
| 9,000,750 B2* | 4/2015 | Yu | G01R 11/185 324/105 |
| 9,369,971 B2* | 6/2016 | Nakashima | H04W 52/242 |
| 9,900,849 B2* | 2/2018 | Xu | H04W 52/325 |
| 10,171,282 B1 | 1/2019 | Marupaduga et al. | |
| 10,187,173 B2* | 1/2019 | Liu | H04B 10/073 |
| 10,374,748 B2* | 8/2019 | Oketani | H04W 72/04 |
| 10,420,947 B2* | 9/2019 | Perryman | A61N 1/37252 |
| 11,026,189 B2* | 6/2021 | Vintola | H04L 5/0048 |
| 11,101,955 B2* | 8/2021 | Li | H04B 7/0639 |
| 11,601,247 B2* | 3/2023 | Brunel | H04L 27/2605 |
| 11,770,228 B2* | 9/2023 | Brunel | H04L 27/26025 370/329 |
| 11,844,026 B2* | 12/2023 | Dinan | H04W 52/146 |
| 2010/0255790 A1* | 10/2010 | Farajidana | H04B 17/26 455/69 |
| 2014/0028285 A1* | 1/2014 | Yu | G01R 19/0092 324/105 |
| 2014/0161093 A1* | 6/2014 | Hoshino | H04B 7/024 370/328 |
| 2014/0221038 A1* | 8/2014 | Nakashima | H04L 5/0051 455/522 |
| 2014/0241301 A1* | 8/2014 | Nakashima | H04W 52/365 370/329 |
| 2015/0264683 A1* | 9/2015 | Kim | H04L 5/0007 370/329 |
| 2015/0282178 A1* | 10/2015 | Kim | H04W 72/0453 370/329 |
| 2016/0165545 A1* | 6/2016 | Ouchi | H04W 52/48 455/522 |
| 2016/0174172 A1* | 6/2016 | Rahman | H04W 52/16 455/522 |
| 2017/0285137 A1* | 10/2017 | West | H01Q 25/02 |
| 2018/0152259 A1* | 5/2018 | Liu | G02B 6/3518 |
| 2018/0262295 A1* | 9/2018 | Oketani | H04W 28/065 |
| 2018/0323846 A1* | 11/2018 | Tsai | H04B 7/0617 |
| 2018/0368078 A1* | 12/2018 | Vintola | H04L 5/0048 |
| 2019/0020389 A1* | 1/2019 | Liu | H04L 5/0026 |
| 2019/0036206 A1* | 1/2019 | de Rochemont | H01Q 15/0046 |
| 2020/0044803 A1* | 2/2020 | Li | H04L 5/0048 |
| 2021/0014979 A1* | 1/2021 | Adler | G06F 30/398 |
| 2021/0028850 A1* | 1/2021 | Elliott | H04B 7/088 |
| 2021/0036684 A1* | 2/2021 | Schiek | H03H 9/542 |
| 2021/0116501 A1* | 4/2021 | Martineau | H03B 5/1203 |
| 2022/0030525 A1* | 1/2022 | Chincholi | H04B 17/14 |
| 2022/0141803 A1* | 5/2022 | Guo | H04W 72/563 370/329 |
| 2022/0149891 A1* | 5/2022 | Strobel | H04B 3/04 |
| 2022/0159736 A1* | 5/2022 | Chen | H04W 74/0833 |
| 2022/0174613 A1* | 6/2022 | Liu | H04W 52/24 |

FOREIGN PATENT DOCUMENTS

| | | | | |
|---|---|---|---|---|
| CN | 109041094 A | | 12/2018 | |
| CN | 109150242 A | | 1/2019 | |
| CN | 109151973 A | | 1/2019 | |
| EP | 3557808 B1 * | | 2/2022 | H04B 17/318 |
| WO | 2018127181 A1 | | 7/2018 | |
| WO | WO-2018137424 A1 * | | 8/2018 | H04B 17/318 |
| WO | WO-2019029433 A1 * | | 2/2019 | H04B 7/01 |

OTHER PUBLICATIONS

PCT International Search Report and Written Opinion issued in International Application No. PCT/CN2019/101204 on May 22, 2020, 15 pages (with English translation).

EPO Partial Supplementary European Search Report issued in European Application No. 19942114.0 on Aug. 23, 2022, 17 pages.

Qualcomm Incorporated, "SRS Hopping," 3GPP TSG-RAN WG4 Meeting NR ad-hoc #3, R4-1709833, Nagoya, Japan, Sep. 18-21, 2017, 5 pages.

* cited by examiner

SIGNAL SENDING METHOD AND APPARATUS, AND SIGNAL RECEIVING METHOD AND APPARATUS

CROSS-REFERENCE TO RELATED APPLICATIONS

This application is a continuation of International Application No. PCT/CN2019/101204, filed on Aug. 16, 2019, the disclosure of which is hereby incorporated by reference in its entirety.

TECHNICAL FIELD

Embodiments of this application relate to the field of communication technologies, and in particular, to a signal sending method and apparatus, and a signal receiving method and apparatus.

BACKGROUND

In a communication system, for a time division duplex (Time Division Duplex, TDD) mode, because uplink and downlink frequency bands are the same, a base station can perform based on channel reciprocity, timing (time offset estimation and time synchronization), measurement (measurement on a noise interference power, a signal-to-noise ratio, and the like), channel estimation (which is a measurement function used to obtain a channel transmission characteristic), and the like on an uplink channel by measuring a sounding reference signal (Sounding Reference Signal, SRS) of the uplink channel. Beamforming of a downlink-optimized multiple-input multiple-output (Multi-input Multi-output, MIMO) antenna array is performed on a channel based on the channel reciprocity, to achieve optimal data transmission performance in downlink MIMO.

A terminal device (terminal device) may report different antenna implementations such as one transmitter and two receivers (1T2R), one transmitter and four receivers (1T4R), and two transmitters and four receivers (2T4R) based on an implementation capability of the terminal device. When a plurality of antennas of the terminal device need to send SRSs, SRS transmission is sequentially switched among the plurality of antennas, and only one antenna sends the SRS at a moment. To obtain full channel information, the terminal device needs to switch from a main antenna for both transmitting and receiving to another antenna for sending the SRS.

Trace routing lengths from the main antenna port for both transmitting and receiving of the terminal device to each antenna port are different. As a result, insertion losses of the antenna ports are different. How to process transmit powers or receive powers based on the insertion losses becomes an urgent problem to be resolved.

SUMMARY

This application provides a signal sending method and apparatus, and a signal receiving method and apparatus. Insertion losses corresponding to different resources are obtained, and transmit powers or receive powers of the different resources are compensated for based on the insertion losses corresponding to the different resources, to obtain more accurate channel quality information.

According to a first aspect, a signal sending method is provided, including: obtaining a first insertion loss corresponding to a first resource and a second insertion loss corresponding to a second resource, where the first insertion loss is different from the second insertion loss; determining a first transmit power corresponding to the first resource based on the first insertion loss; determining a second transmit power corresponding to the second resource based on the second insertion loss; sending a first signal on the first resource based on the first transmit power; and sending a second signal on the second resource based on the second transmit power.

According to the foregoing method, a terminal device determines the transmit powers of the signals based on the different insertion losses corresponding to the resources, so that a network device can accurately measure uplink channel quality when measuring an SRS on an uplink channel.

With the reference to the first aspect, in a possible implementation, the signal sending method further includes: sending second indication information, where the second indication information is used to indicate that the transmit power of the first signal is determined based on the first insertion loss, and/or the second indication information is used to indicate that the transmit power of the second signal is determined based on the second insertion loss.

By reporting the second indication information, the network device may learn whether the terminal device compensates for the transmit powers of the different signals based on the different insertion losses, to accurately measure the uplink channel quality.

According to a second aspect, a signal sending method is provided, including: obtaining a first insertion loss corresponding to a first resource and a second insertion loss corresponding to a second resource, where the first insertion loss is different from the second insertion loss; and sending first indication information, where the first indication information is used to indicate the first insertion loss and the second insertion loss.

By reporting the first indication information, a network device may learn the different insertion losses corresponding to different signals sent by a terminal device, and may further compensate for receive powers based on the different insertion losses; or may control a terminal device to adjust transmit powers of different signals, to accurately measure uplink channel quality.

According to the second aspect, in a possible implementation, the foregoing signal sending method further includes: receiving signaling, where the signaling is used to indicate to send first power adjustment information of a first signal on the first resource and/or second power adjustment information of a second signal on the second resource; and determining a transmit power of the first signal based on the first power adjustment information; and/or determining a transmit power of the second signal based on the second power adjustment information.

The network device controls the terminal device to adjust the transmit powers of the different signals based on the different insertion losses, to accurately measure the uplink channel quality.

According to a third aspect, a signal receiving method is provided, including: receiving a first signal on a first resource, where the first resource corresponds to a first insertion loss; receiving a second signal on a second resource, where the second resource corresponds to a second insertion loss, and the second insertion loss is different from the first insertion loss; compensating for a receive power of the first signal based on the first insertion loss; and compensating for a receive power of the second signal based on the second insertion loss.

A network device compensates for the receive powers based on the different insertion losses, to accurately measure uplink channel quality.

According to a fourth aspect, a signal sending method is provided, including: receiving a first signal on a first resource, where the first resource corresponds a first insertion loss; receiving a second signal on a second resource, where the second resource corresponds to a second insertion loss, and the first insertion loss is different from the second insertion loss; generating first power adjustment information of the first signal based on the first insertion loss; and/or generating second power adjustment information of the second signal based on the second insertion loss; and sending signaling, where the signaling includes the first power adjustment information and/or the second power adjustment information.

A network device controls a terminal device to adjust transmit powers of the different signals based on the different insertion losses, to accurately measure uplink channel quality.

According to the third aspect or the fourth aspect, in a possible implementation, the signal receiving method or the signal sending method further includes: receiving first indication information, where the first indication information is used to indicate the first insertion loss and the second insertion loss, or the first insertion loss and the second insertion loss are pre-configured.

According to a fifth aspect, a signal sending apparatus is provided, including: an obtaining module, a processing module, and a sending module. The obtaining module is configured to obtain a first insertion loss corresponding to a first resource and a second insertion loss corresponding to a second resource, where the first insertion loss is different from the second insertion loss. The processing module is configured to determine a first transmit power corresponding to the first resource based on the first insertion loss; and determine a second transmit power corresponding to the second resource based on the second insertion loss. The sending module is configured to send a first signal on the first resource based on the first transmit power, and send a second signal on the second resource based on the second transmit power.

According to the fifth aspect, in a possible implementation, the sending module is further configured to send second indication information, where the second indication information is used to indicate that the transmit power of the first signal is determined based on the first insertion loss, and/or the second indication information is used to indicate that the transmit power of the second signal is determined based on the second insertion loss.

According to a sixth aspect, a signal sending apparatus is provided, including: an obtaining module, configured to obtain a first insertion loss corresponding to a first resource and a second insertion loss corresponding to a second resource, where the first insertion loss is different from the second insertion loss; and a sending module, configured to send first indication information, where the first indication information is used to indicate the first insertion loss and the second insertion loss.

According to the sixth aspect, in a possible implementation, the apparatus further includes: the obtaining module, where the obtaining module is configured to receive signaling, where the signaling is used to indicate to send first power adjustment information of a first signal on the first resource and/or second power adjustment information of a second signal on the second resource; and a processing module, where the processing module is configured to determine a transmit power of the first signal based on the first power adjustment information, and/or determine a transmit power of the second signal based on the second power adjustment information.

With reference to any one of the foregoing aspects or possible implementations, in a possible implementation, the first insertion loss is zero, and/or the second insertion loss is an offset value relative to the first insertion loss.

In the foregoing manners, signaling overheads may be reduced during reporting.

According to a seventh aspect, a communication apparatus is provided, including a processor and a memory, where the memory is configured to store instructions, and the processor is configured to read and execute the instructions, to implement the method in the first aspect, the second aspect, and the possible implementations thereof.

According to an eighth aspect, a communication apparatus is provided, including a processor and a memory, where the memory is configured to store instructions, and the processor is configured to read and execute the instructions, to implement the method in the third aspect, the fourth aspect, and the possible implementations thereof.

According to a ninth aspect, a communication apparatus is provided, including a processor and a communication interface, where the processor communicates with the outside through the communication interface, and the processor is configured to run a computer program, so that the communication apparatus is enabled to implement the method in the first aspect, the second aspect, and the possible implementations thereof.

According to a tenth aspect, a communication apparatus is provided, including a processor and a communication interface, where the processor communicates with the outside through the communication interface, and the processor is configured to run a computer program, so that the communication apparatus is enabled to implement the method in the third aspect, the fourth aspect, and the possible implementations thereof.

With reference to the ninth aspect, the tenth aspect, or any possible implementation, the communication apparatus is a chip or a chip system.

According to an eleventh aspect, a computer-readable storage medium is provided, where the computer-readable storage medium stores a computer program, and when the computer program is executed by a computer, the computer is enabled to implement the methods in the foregoing aspects and the possible implementations thereof.

According to a twelfth aspect, a computer program product is provided including instructions. When the computer program product runs on a computer, the computer is enabled to implement the methods in the foregoing aspects or the possible implementations.

According to a thirteenth aspect, a communication system is provided, including the communication apparatus according to any one of the seventh aspect, the ninth aspect, or the possible implementations; and the communication apparatus according to any one of the eighth aspect, the tenth aspect, or the possible implementations.

For technical effects of the fifth aspect to the thirteenth aspect, refer to content described in the possible implementations of the first aspect to the fourth aspect.

DESCRIPTION OF EMBODIMENTS

To make the objectives, technical solutions, and advantages of this application clearer, the following describes this application more comprehensively with reference to the accompanying drawings. This application may be implemented in different forms, and the forms should not be construed as being limited to embodiments provided in this specification. The foregoing embodiments provided are intended to make the disclosure of this specification comprehensive and complete, to convey the protection scope of this application to a person skilled in the art more comprehensively.

It should be understood that, the technical solutions of this application may be applied to various communication systems, such as a global system for mobile communication (Global System for Mobile communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, a long term evolution-advanced (LTE-A) system, an LTE frequency division duplex (Frequency Division Duplex, FDD) system, an LTE time division duplex (Time Division Duplex, TDD) system, a universal mobile telecommunication system (Universal Mobile Telecommunication System, UMTS), a worldwide interoperability for microwave access (Worldwide Interoperability for Microwave Access, WiMAX) communication system, a next-generation communication system (for example, a fifth-generation (fifth-generation, 5G) communication system), an integrated system of a plurality of access systems, and an evolved system. The 5G system may be also referred to as a new radio access technology (new radio access technology, NR) system. The technical solutions provided in this application may be further applicable to future communication systems, for example, a sixth generation mobile communication system. The communication system may alternatively be a public land mobile network (Public Land Mobile Network, PLMN), a device-to-device (device-to-device, D2D) communication system, a machine-to-machine (machine-to-machine, M2M) communication system, an Internet of things (Internet of Things, IoT) communication system, or another communication system.

For ease of understanding of the embodiments of this application, a communication system applicable to the embodiments of this application is first described in detail with reference to FIG. 1.

Figure 1:
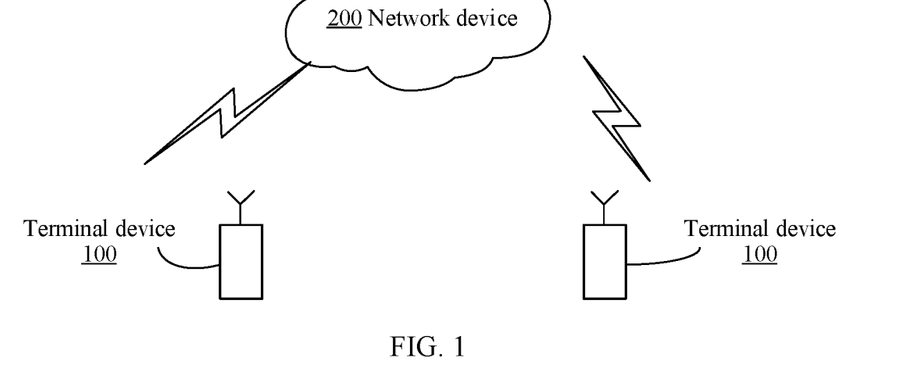
FIG. 1 is a schematic diagram of a communication system according to an embodiment of this application.

FIG. 1 is a wireless communication system applicable to a signal sending method and a signal receiving method according to an embodiment of this application. The communication system may include at least one network device, for example, a network device 200 shown in FIG. 1. The network device 200 may provide communication coverage for a specific geographic area, and may communicate with a terminal device located in the coverage area.

The communication may further include at least one terminal device, for example, a terminal device 100 shown in FIG. 1. The terminal device 100 may be mobile or fixed. The terminal device 100 may communicate with one or more core networks (core networks) by using a radio access network (radio access network, RAN).

It should be understood that the terminal device 100 may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in the embodiments of this application may be a mobile phone (mobile phone), a tablet computer (Pad), a computer with a wireless transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the foregoing terminal device and a chip that may be disposed in the foregoing terminal device are collectively referred to as the terminal device.

As an example instead of a limitation, in the embodiments of this application, a wearable device may also be referred to as a wearable intelligent device. The wearable device is a generic term for wearable devices such as glasses, gloves, watches, clothes, and shoes that are developed based on an intelligent design of daily wearings by using wearable technologies. The wearable device is a portable device that can be directly worn by a user or integrated into clothes or an accessory of a user. The wearable device is not only a hardware device, but also implements a powerful function through software support, a data exchange, and cloud interaction. Generalized wearable intelligent devices include devices that are full-featured and large-size, and that can implement complete or some functions without depending on a smartphone, for example, a smart watch or smart glasses, and the generalized wearable intelligent devices focus on only one type of application function and need to work with other devices such as the smartphone, for example, various smart bands or smart jewelry for monitoring physical signs.

In addition, the terminal device in the embodiments of this application may alternatively be a terminal device in an IoT system. The IoT is an important part of future development of information technologies, and a main technical feature of the IoT is connecting a thing to a network by using a communication technology, to implement an intelligent network of interconnection between a person and a machine or between one thing and another thing. In the embodiments of this application, an IoT technology may implement massive connections, deep coverage, and terminal power saving by using, for example, a narrowband (narrowband, NB) technology.

In addition, in the embodiments of this application, the terminal device may further include a sensor, for example, an intelligent printer, a train detector, or a gas station. Main functions of the terminal device include collecting data (for some terminal devices), receiving control information and downlink data from a network device, sending an electromagnetic wave, and transmitting uplink data to a network device.

The network device in the embodiments of this application may be any communication device that has a wireless transceiver function and that is configured to communicate with a terminal device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, HeNB; or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission and reception point (transmission and reception point, TRP), or the like. The device may alternatively be a gNB or a transmission point (TRP or TP) in a 5G system such as an NR system, may be one base station or a group of base stations (including a plurality of antenna panels) of a gNB in a 5G system, or may be a network node, such as a baseband unit (BBU) or a distributed unit (distributed unit, DU), that constitutes a gNB or a transmission point.

In some deployments, the gNB may include a centralized unit (centralized unit, CU) and a DU. The gNB may further include an active antenna unit (active antenna unit, AAU). The CU implements some functions of the gNB, and the DU implements some functions of the gNB. For example, the CU is responsible for processing a non-real-time protocol and a non-real-time service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some processing functions of a physical layer, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in the radio access network (radio access network, RAN), or the CU may be classified into a network device in the core network (core network, CN). This is not limited in this application.

The foregoing communication system applicable to this application is merely an example. The communication system applicable to this application is not limited thereto. For example, quantities of network devices and terminal devices included in the communication system may alternatively be another quantities, or a D2D communication scenario is applied.

In the embodiments of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). An operating system may be any one or more computer operating systems that implement service processing through a process (process), for example, a Linux operating system, a Unix operating system, an Android operating system, an IOS operating system, or a windows operating system. The application layer includes applications such as a browser, an address book, word processing software, and instant messaging software. In addition, a specific structure of an entity for performing a method provided in the embodiments of this application is not particularly limited in the embodiments of this application, provided that the entity can run a program that records code of the method provided in the embodiments of this application to perform communication according to the method provided in the embodiments of this application. For example, the entity for performing the method provided in the embodiments of this application may be a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine-readable storage media" may include but is not limited to a radio channel, and various other media that can store, include, and/or carry instructions and/or data.

In addition, to facilitate understanding of the embodiments of this application, the following several descriptions are provided.

First, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

Information indicated by the indication information is referred to as to-be-indicated information. In a specific implementation process, the to-be-indicated information may be indicated in a plurality of manners, for example, but not limited to, a manner of directly indicating the to-beindicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, specific information may also be indicated by using a pre-agreed (for example, specified in a protocol) arrangement sequence of various pieces of information, to reduce indication overheads to some extent. In addition, a common part of all pieces of information may be further identified and indicated in a unified manner, to reduce indication overheads caused by separately indicating same information. For example, a person skilled in the art should understand that a precoding matrix includes precoding vectors, and each precoding vector in the precoding matrix may have a same part in terms of composition or another attribute.

In addition, a specific indication manner may alternatively be various existing indication manners, for example, but not limited to, the foregoing indication manners and various combinations thereof. For details of various indication manners, refer to the conventional technology. Details are not described in this specification. It can be learned from the foregoing descriptions that, for example, when a plurality of pieces of information of a same type need to be indicated, manners of indicating different information may be different. In a specific implementation process, a required indication manner may be selected based on a specific requirement. The selected indication manner is not limited in the embodiments of this application. In this way, the indication manner in the embodiments of this application should be understood as covering various methods that can enable a to-be-indicated party to learn of the to-be-indicated information.

In addition, the to-be-indicated information may have another equivalent form. For example, a row vector may be represented as a column vector. A matrix may be represented by using a transposed matrix of the matrix, and the matrix may alternatively be represented in a form of a vector or an array. The vector or the array may be formed by connecting row vectors or column vectors in the matrix. The technical solutions provided in the embodiments of this application should be understood as covering various forms. For example, some or all features in the embodiments of this application should be understood as covering various representations of the features.

The to-be-indicated information may be sent as a whole, or may be divided into a plurality of pieces of sub-information for separate sending, and sending periodicities and/or sending occasions of the sub-information may be the same or may be different. A specific sending method is not limited in this application. The sending periodicities and/or the sending occasions of the sub-information may be predefined, for example, predefined according to a protocol, or may be configured by a transmit end device by sending configuration information to a receive end device. The configuration information may include, for example, but not limited to, one or a combination of at least two of radio resource control signaling, media access control (media access control, MAC) layer signaling, and physical layer signaling. The radio resource control signaling is, for example, RRC layer signaling. The MAC layer signaling includes, for example, a MAC control element (control element, CE). The physical layer signaling includes, for example, DCI.

Second, in the embodiments shown below, the first, second, and various numerical numbers are used to distinguish similar objects and are not used to describe a particular order or a sequence order. It should be understood that data termed in such a way is interchangeable in proper circumstances, so that the embodiments of this application described herein can be implemented in other orders than the order illustrated or described herein. This is not intended to limit the scope of the embodiments of this application. For example, different preset correspondences are distinguished between each other.

Third, in the embodiments shown below, "being preset" or "being pre-configured" may include being indicated by network device signaling or predefined, for example, being defined by a protocol. "Being pre-defined" may be implemented by pre-storing corresponding code or a corresponding table in a device (for example, including a terminal device and a network device), or in another manner that may be used to indicate related information. A specific implementation is not limited in this application.

Fourth, "being stored" in the embodiments of this application may be stored in one or more memories. The one or more memories may be separately disposed, or may be integrated into an encoder or a decoder, a processor, or a communication apparatus. Alternatively, a part of the one or more memories may be separately disposed, and a part of the one or more memories are integrated into a decoder, a processor, or a communication apparatus. A type of the memory may be a storage medium in any form. This is not limited in this application.

Fifth, "protocol" in the embodiments of this application may be a standard protocol in the communication field, for example, may include an LTE protocol, an NR protocol, and a related protocol applied to a future communication system. This is not limited in this application.

Sixth, terms such as "including" and "comprising" in the embodiments of this application indicate that in addition to units and steps that are directly and explicitly stated in the specification and claims, the technical solutions in the embodiments of this application also do not exclude a case in which other units and steps that are not directly or explicitly stated exist.

For ease of understanding of the embodiments of this application, the following briefly describes an SRS with reference to the communication system shown in FIG. 1.

The SRS is used to perform sounding on uplink channel quality. The terminal device 100 sends the SRS on an uplink channel, and the network device 200 performs measurement on the uplink channel based on the received SRS, to determine uplink channel quality of the terminal device 100.

In the LTE, uplink system bandwidth may be divided into two parts. A region located on two sides of the uplink system bandwidth is used to send a PUCCH, where the SRS does not need to be sent to perform uplink channel measurement, and a region located in the middle of the uplink system bandwidth, namely, a region other than the region used to send the PUCCH, is used to send a PUSCH, where the SRS needs to be sent to perform uplink channel measurement, so that the network device performs resource scheduling.

It should be understood that, for a principle and a process of performing the uplink channel measurement based on the SRS, refer to the conventional technology. To avoid repetition, detailed description of the specific process is omitted herein.

Figure 2:
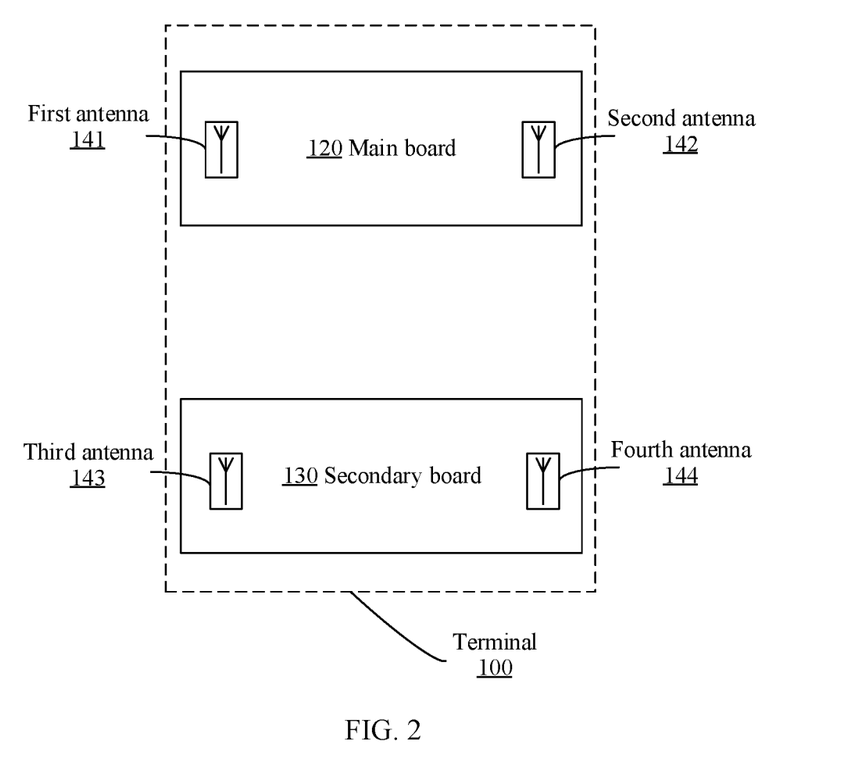
FIG. 2 is a schematic diagram of a structure of a terminal device according to an embodiment of this application.

FIG. 2 shows a terminal device 100. Refer to FIG. 2. The terminal device 100 includes a main board 120, a secondary board 130, a first antenna 141 and a second antenna 142 that are connected to the main board 120 via trace routing, and a third antenna 143 and a fourth antenna 144 that are connected to the secondary board 130 via the trace routing. The terminal device 100 supports 4-antenna SRS polling transmission, and the trace routing exists among the four antennas 141 to 144.

The terminal device 100 is in a 1T4R mode, namely, a one-transmit four-receive mode. The first antenna 141 is a main antenna, namely, an antenna for both transmitting and receiving, and the second antenna 142, the third antenna 143, and the fourth antenna 144 are receive antennas.

When the terminal device 100 switches from the antenna 141 for both transmitting and receiving to the antenna 142, the antenna 143, and the antenna 144 to send an SRS, because circuit trace routing paths from the antenna for both transmitting and receiving to the other antennas are different, insertion losses generated by the antennas are also different. A relative insertion loss is recorded as $\Box T_{RxSRS}$. For example, as shown in FIG. 2, because trace routing manners and trace routing lengths between the three receive antennas 142, 143, 144 and the main antenna 141 are different, corresponding three relative insertion losses $\Box T_{RxSRS}$ 1, $\Box T_{RxSRS}$ 2, and $\Box T_{RxSRS}$ 3 are also different.

When the terminal device 100 is designed or produced, the terminal device 100 can learn the insertion losses $\Box T_{RxSRS}$ 1, $\Box T_{RxSRS}$ 2, and $\Box T_{RxSRS}$ 3 of signals transmitted through the receive antennas 142, 143, and 144 relative to a signal transmitted through the main antenna 141 based on a circuit design and a cabling manner of a circuit board. The three insertion losses may be written into the terminal device 100 as physical parameters of the terminal device 100 in advance.

$\Box T_{RxSRS}$ is one parameter used by the terminal device to calculate a configured maximum output power of the terminal device (the configured maximum UE output power, PCMAX). According to the 38.101-1 protocol of the 3rd generation partnership project (3rd Generation Partnership Project, 3GPP), when the terminal device performs antenna selection of switching from the transmit antenna for both transmitting and receiving to another antenna, on a frequency band whose frequency range is lower than n79 (from 4400 MHz to 5000 MHz), when calculating the PCMAX, the terminal device may add an insertion loss of 3 dB on an antenna tributary, that is, $\Box T_{RxSRS}$=3 dB; and on a frequency band within n79, the terminal device may add an insertion loss of 4.5 dB on the antenna tributary, that is, $\Box T_{RxSRS}$=4.5 dB.

Because the trace routing lengths from the main antenna for both transmitting and receiving of the terminal device to the other antennas are different and a uniform insertion loss is used, an actual power of each antenna port of the terminal device is different from a configured power calculated based on the PCMAX. A network side does not know the specific $T_{RxSRS}$ and cannot accurately compensate for imbalance of switching a transmit power of each antenna port by an SRS antenna based on the insertion loss. Therefore, when measurement is performed on an SRS on an uplink channel, uplink channel quality measurement cannot be accurately implemented, thereby affecting codebook selection during communication on the network side.

Without loss of generality, interaction between the network device and the terminal device is used as an example to describe in detail the signal sending method and the signal receiving method provided in the embodiments of this application.

Further, the following describes in detail the embodiments of this application by using the terminal device 100 and the network device 200 as examples.

It should be understood that the terminal device may be any terminal device that is in a wireless communication system and that has a wireless connection relationship with the network device. In addition, the network device and a plurality of terminal devices that are in the wireless communication system and that have the wireless connection relationship may transmit a reference signal based on a same technical solution. It should be further understood that in this embodiment of this application, the SRS is used as an example of an uplink reference signal to describe the technical solutions provided in this application. However, this should not constitute any limitation on this application. This application does not rule out that other uplink reference signals, such as a demodulation reference signal (demodulation reference signal, DMRS), another control channel, or a data channel, are defined in a future protocol to implement a same or similar function.

Figure 3:
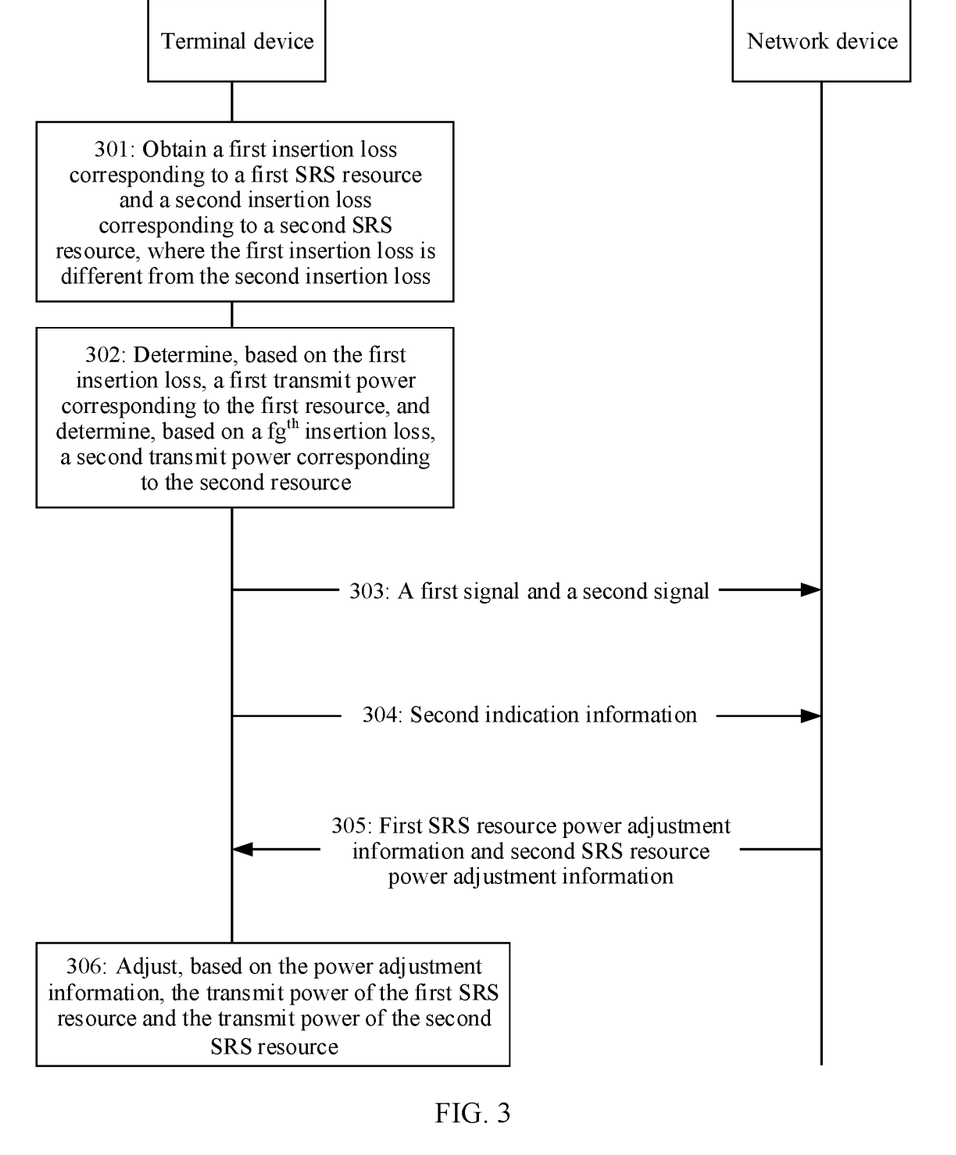
FIG. 3 is a schematic flowchart of a signal sending method according to an embodiment of this application.

FIG. 3 is a schematic flowchart of a signal sending method according to an embodiment of this application, to improve channel measurement precision, and improve demodulation performance.

As shown in FIG. 3, the signal sending method may include the following steps.

Step 301: A terminal device obtains a first insertion loss corresponding to a first SRS resource and a second insertion loss corresponding to a second SRS resource, where the first insertion loss is different from the second insertion loss.

Optionally, in this embodiment of this application, the terminal device 100 may obtain a plurality of SRS resources, and/or obtain antenna information or antenna port information corresponding to each of the plurality of SRS resources (antennas 141, 142, 143, and 144 are respectively mapped to the plurality of SRS resources); and obtain different insertion losses $\Box T_{RxSRS}$ corresponding to the plurality of SRS resources. The plurality of SRS resources include the first SRS resource and the second SRS resource. The plurality of different insertion losses include the first insertion loss and the second insertion loss. This embodiment of this application is described by using the first SRS resource and the second SRS resource as examples, but is also applicable to a scenario in which a plurality of SRS resources are included. Details are not described again.

It may be understood that the insertion loss corresponding to the SRS resource may also be understood as an insertion loss corresponding to an antenna port associated with the SRS resource, or may be understood as a corresponding insertion loss for sending an SRS. An antenna port associated with one SRS resource may be specifically an antenna port used for sending an SRS on the SRS resource.

It may be understood that the antenna port may be a physical antenna port or a logical antenna port. This is not limited in this embodiment of this application.

Table 1 below shows an example mapping relationship among the SRS resource, the insertion loss, and the antenna port.

TABLE 1

A mapping relationship between an SRS resource and an
insertion loss of an antenna port

| SRS resource | Transmission port | Insertion loss |
|---|---|---|
| SRS resource set ID 0 + SRS resource ID 0 | Antenna port 141 | $\Delta T_{RxSRS} = 0$ |
| SRS resource set ID 0 + SRS resource ID 1 | Antenna port 142 | $\Delta T_{RxSRS} = 1$ |
| SRS resource set ID 1 + SRS resource ID 0 | Antenna port 143 | $\Delta T_{RxSRS} = 2$ |
| SRS resource set ID 1 + SRS resource ID 1 | Antenna port 144 | $\Delta T_{RxSRS} = 1$ |

In an implementation, when sending a plurality of SRS signals, the terminal device 100 maps the main antenna 141 to the first SRS resource in the plurality of SRS resources. The main antenna 141 is used as a start antenna for transmitting the plurality of SRS signals, and has no insertion loss relative to another antenna. In other words, a relative insertion loss of the main antenna 141 is zero. When sending the SRS signal on the first SRS resource through the main antenna 141, the terminal device 100 calculates a configured transmit power of the terminal device 100 based on the relative insertion loss, namely, the parameter, being zero.

The receive antenna 142 is mapped to a second SRS resource. When the SRS signal is switched from the main antenna 141 to the receive antenna 142 for sending, a loss caused by a component and a cabling from the main antenna 141 to the receive antenna 142 exists in a signal transmission process. The relative insertion loss $\Delta T_{RxSRS}$ 1 in Table 1 is a positive value, for example, 1.5 dB (it may be understood that, as shown in FIG. 2, a distance between the main antenna 141 and the receive antenna 142 is relatively short, a trace routing length between the main antenna 141 and the receive antenna 142 is short, and a signal loss generating in a path switching process is not high). When sending the SRS signal on the second SRS resource through the receive antenna 142, the terminal device 100 calculates the configured transmit power of the terminal device 100 based on the relative insertion loss, namely, the parameter, being 1.5 dB.

The receive antenna 143 is mapped to a third SRS resource. When the SRS signal is switched from the receive antenna 141 to the receive antenna 143 for sending, a loss caused by a component and a cabling from the main antenna 141 to the receive antenna 143 exists in a signal transmission process. The relative insertion loss $\Delta T_{RxSRS}$ 2 in Table 1 is also a positive value, for example, 2.0 dB (it may be understood that, as shown in FIG. 2, a distance between the receive antenna 141 and the receive antenna 143 is relatively short, a trace routing length between the receive antenna 141 and the receive antenna 143 is short, and a signal loss generating in a path switching process is not high). When sending the SRS signal on the third SRS resource through the receive antenna 143, the terminal device 100 calculates the configured transmit power of the terminal device 100 based on the relative insertion loss, namely, the parameter, being 2.0 dB.

The receive antenna 144 is mapped to a fourth SRS resource. When the SRS signal is switched from the receive antenna 141 to the receive antenna 144 for sending, a loss caused by a component and a cabling from the main antenna 141 to the receive antenna 144 exists in a signal transmission process. The relative insertion loss $\Delta T_{RxSRS}$ 2 in Table 1 is also a positive value, for example, 3.0 dB (it may be understood that, as shown in FIG. 2, a distance between the receive antenna 141 and the receive antenna 144 is relatively long, the receive antenna 141 and the receive antenna 144 are arranged diagonally, and a signal loss existing in a path switching process is relatively high). When sending the SRS signal on the fourth SRS resource through the receive antenna 144, the terminal device 100 calculates the configured transmit power of the terminal device 100 based on the relative insertion loss, namely, the parameter, being 3.0 dB.

In an implementation, the first SRS resource and the second SRS resource are configured by a network device for the terminal device, for example, configured by using higher layer signaling such as a radio resource control (radio resource control, RRC) message, a media access control control element (media access control control element, MAC CE), or physical layer signaling. This is not limited in this embodiment of this application. Further, the RRC message may be a dedicated RRC message, or an RRC message shared by a group of terminal devices or all terminal devices, for example, a broadcast message. This is not limited in this embodiment of this application. The terminal device obtains the first SRS resource and the second SRS resource by receiving configuration information.

In an implementation, the first SRS resource and the second SRS resource are pre-configured according to a protocol.

In an implementation, an antenna port corresponding to the first SRS resource and an antenna port corresponding to the second SRS resource are configured by the network device for the terminal device, or the mapping relationship between the SRS resource and the antenna port is configured by the network device for the terminal device, for example, configured by using the higher layer signaling such as the radio resource control (radio resource control, RRC) message, the media access control control element (media access control control element, MAC CE), or the physical layer signaling. This is not limited in this embodiment of this application. Further, the RRC message may be the dedicated RRC message, or the RRC message shared by the group of terminal devices or all terminal devices, for example, the broadcast message. This is not limited in this embodiment of this application. The terminal device obtains the antenna port corresponding to the first SRS resource and the antenna port corresponding to the second SRS resource by receiving the configuration information. For an example of a specific mapping relationship, refer to Table 1.

In an implementation, the antenna port corresponding to the first SRS resource and the antenna port corresponding to the second SRS resource are configured by the network device for the terminal device, or the mapping relationship between the SRS resource and the antenna port is pre-configured according to the protocol. For an example of a specific mapping relationship, refer to Table 1.

In an implementation, the insertion loss corresponding to the first SRS resource and the insertion loss corresponding to the second SRS resource are configured by the network device for the terminal device, or the mapping relationship between the SRS resource and the insertion loss is configured by the network device for the terminal device, for example, configured by using the higher layer signaling such as the radio resource control (radio resource control, RRC) message, the media access control control element (media access control control element, MAC CE), or the physical layer signaling. This is not limited in this embodiment of this application. Further, the RRC message may be the dedicated RRC message, or the RRC message shared by the group of terminal devices or all terminal devices, for example, the broadcast message. This is not limited in this embodiment of this application. The terminal device obtains the insertion loss corresponding to the first SRS resource and the insertion loss corresponding to the second SRS resource by receiving the configuration information. For an example of a specific mapping relationship, refer to Table 1.

In an implementation, the insertion loss corresponding to the first SRS resource and the insertion loss corresponding to the second SRS resource are pre-configured according to the protocol, or the mapping relationship between the SRS resource and the insertion loss is pre-configured according to the protocol. For an example of a specific mapping relationship, refer to Table 1.

In an implementation, the insertion loss corresponding to the first SRS resource and the insertion loss corresponding to the second SRS resource are determined based on an antenna attribute and/or a circuit design attribute of the terminal device. In other words, the mapping relationship between the SRS resource and the insertion loss is determined based on the antenna attribute of the terminal device. Different types of terminal devices may have different mapping relationships, and a same type of terminal devices may even have different mapping relationships due to differences in models, processes, and the like. For an example of a specific mapping relationship, refer to Table 1.

Specifically, a unit of the insertion loss may be dB, in other words, the insertion loss is an offset value relative to a reference value. The offset value may be greater than 0, equal to 0, or less than 0.

Generally, an insertion loss corresponding to the main antenna port is set to the reference value, for example, 0 dB. Insertion losses of other antenna ports are relative to that of the main antenna port. As shown in Table 1, it is assumed that the antenna port 141 corresponding to an SRS resource 0 in an SRS resource set 0 is a main antenna, and an insertion loss $\Delta T_{RxSRS}$ corresponding to the antenna port 141 is 0; and the antenna port 142 is corresponding to an SRS resource 1 in the SRS resource set 0, and an insertion loss $\Delta T_{RxSRS}$ of the antenna port 142 is 1. It is equivalent that the insertion loss corresponding to the antenna port 142 is increased by 1 dB based on the insertion loss of the antenna port 141, in other words, the insertion loss of the antenna port 142 is greater than the insertion loss of the antenna port 141 of 1 dB. Similarly, an insertion loss $\Delta T_{RxSRS}$ of the antenna port 143 corresponding to the SRS resource 0 in the SRS resource set 1 is 2. It is equivalent that the insertion loss corresponding to the antenna port 143 is increased by 2 dB based on the insertion loss of the antenna port 141, in other words, the insertion loss of the antenna port 143 is greater than the insertion loss of the antenna port 141 of 1 dB. An insertion loss $\Delta T_{RxSRS}$ of the antenna port 144 corresponding to the SRS resource 1 in the SRS resource set 1 is 1. It is equivalent that the insertion loss corresponding to the antenna port 144 is increased by 1 dB based on the insertion loss of the antenna port 141, in other words, the insertion loss of the antenna port 142 is greater than the insertion loss of the antenna port 141 of 1 dB.

It may be understood that the antenna port corresponding to the first SRS resource may be the main antenna, and the insertion loss corresponding to the first SRS resource may be used as a reference for the insertion loss of the second SRS resource. That is, the insertion loss of the second SRS resource is an offset value relative to the first insertion loss.

Optionally, an antenna port that has an insertion loss used as the reference insertion loss may alternatively be any antenna port, or even a virtual antenna port other than the main antenna port (that is, the insertion loss is used only as a reference value of an insertion loss of another physical antenna port or logical antenna port). For example, Table 1 is used as an example. It is assumed that the insertion loss of the antenna port 142 is a reference 0, the insertion loss of the antenna port 141 is 1 dB, and the insertion loss of the antenna port 141 is 1 dB lower than the insertion loss of the antenna port 142. Similarly, the insertion loss of the antenna port 143 is 1 dB, and the insertion loss of the antenna port 144 is 0 dB, or the like. In other words, the antenna port that has the insertion value used as the reference value is not limited in this application.

Optionally, the foregoing reference value may be another value other than 0. The another value may be defined in a protocol, or may be configured by using the network device. This is not limited in this embodiment of this application.

Step 302: The terminal device determines a first transmit power corresponding to the first resource based on the first insertion loss, and determines a second transmit power corresponding to the second resource based on the fg$^{th}$ insertion loss.

Specifically, the terminal device determines the transmit power corresponding to each SRS resource based on the insertion loss $\Delta T_{RxSRS}$ corresponding to each SRS resource.

It may be understood that the transmit power corresponding to the SRS resource may specifically refer to a transmit power required for sending the SRS on the SRS resource.

Specifically, the transmit power corresponding to the SRS resource may be determined by using the following formula:

$$P_{CMAX\_L,f,c}=\text{MIN}\{P_{EMAX,c}-\Delta TC, c, (P_{PowerClass}-\Delta P_{PowerClass})-\text{MAX}(MPR_c+A\text{-}MPR_c+\Delta T_{IB,c}+\Delta T_{C,c}+\Delta T_{RxSRS}, P\text{-}MPRc)\} \quad \text{formula (1)}$$

In the formula:

PEMAX represents a maximum uplink transmit power available in a cell in which the terminal device is located;

C represents a serving cell;

$\Delta$TC represents a value generated by allowed additional output power reduction when uplink transmission is performed on an RB resource located at an edge of a frequency band;

PPowerClass is a power level of the terminal device, and represents a maximum power that can be transmitted by the terminal device;

MPR represents a power backoff value required when an uplink signal is sent based on a transmission resource allocated to the terminal device (a quantity of RBs, positions of the RBs, a signal modulation scheme, and the like);

A-MPR is an additional power backoff value required to meet a specific spectrum-related indicator;

$T_{IB}$ represents an additional insertion loss introduced by a combiner during carrier aggregation; and P-MPR$_c$ represents a transmit power that can be independently reduced by UE to meet a specific absorption rate (Specific Absorption Rate, SAR) indicator of a human body.

It should be noted that the foregoing parameters may remain unchanged when the SRS signal is sent. In this case, transmit power imbalance of each antenna port is determined only by the $\Delta T_{RxSRS}$.

According to formula (1), the terminal device determines $P_{CMAX\_L,f,c}$ based on $\Delta T_{RxSRS}$ of different antenna ports, and then determines, based on $P_{CMAX\_L,f,c}$, the transmit power for sending the SRS on the SRS resource.

Because different antenna ports have different $\Delta T_{RxSRS}$, when other parameters are the same, different $P_{CMAX\_L,f,c}$ may be obtained, and different transmit powers may be implemented for different SRS resources.

Step 303: The terminal device sends a first signal on the first SRS resource, and sends a second signal on the second SRS resource. Correspondingly, the network device receives the first signal and the second signal.

Specifically, the terminal device sends the SRS signal on each SRS resource by using the transmit power determined in step 302.

It may be understood that the first SRS resource and the second SRS resource may completely overlap, partially overlap, or not overlap at all in time. Further, the first signal and the second signal may completely overlap, partially overlap, or not overlap at all. This is not limited in this embodiment of this application.

By using the foregoing method, the transmit powers of signals on the different resources can be accurately compensated for.

Step 304: The terminal device sends second indication information, where the second indication information is used to indicate that the first transmit power is determined based on the first insertion loss, and/or the second indication information is used to indicate that the second transmit power is determined based on the second insertion loss. Correspondingly, the network device receives the second indication information.

Specifically, indication information may be 1-bit information, and is used to indicate whether the transmit powers corresponding to all SRS resources are compensated for by using corresponding insertion losses. For example, 1 indicates that compensation is performed, and 0 indicates that compensation is not performed. The indication information may alternatively be 1-bit information for each SRS resource, and is used to indicate whether a transmit power corresponding to each SRS resource is compensated for by using a corresponding insertion loss. For example, 1 indicates that compensation is performed, and 0 indicates that compensation is not performed. A size and a representation form of the indication information are not limited in this embodiment of this application.

This step is optional.

Step 305: The network device sends signaling, where the signaling is used to indicate to send first power adjustment information of the first signal on the first SRS resource and/or second power adjustment information of the second signal on the second SRS resource. Correspondingly, the terminal device receives the signaling.

Specifically, the power adjustment information may be separately sent for the plurality of SRS resources, to adjust the transmit powers corresponding to the plurality of SRS resources.

The signaling may be configured by using the higher layer signaling, such as the RRC message, the MAC CE, or the physical layer signaling. This is not limited in this embodiment of this application. Further, the RRC message may be the dedicated RRC message, or the RRC message shared by the group of terminal devices or all terminal devices, for example, the broadcast message.

This step is optional.

Step 306: The terminal device determines a transmit power of the first signal based on the first power adjustment information, and/or determines a transmit power of the second signal based on the second power adjustment information.

This step is optional.

Further, the terminal device sends the SRS based on the determined transmit power of each SRS resource.

According to the method in this embodiment of this application, on one hand, the transmit powers of the signals on the different resources may be accurately compensated for. On the other hand, the network device may also accurately compensate for the receive power of each SRS resource based on the reported insertion loss of each SRS resource. Further, the power adjustment information may be separately sent by the network device for the plurality of SRS resources, to adjust the transmit powers corresponding to the plurality of SRS resources. Therefore, channel measurement precision is improved and demodulation performance is improved.

Figure 4:
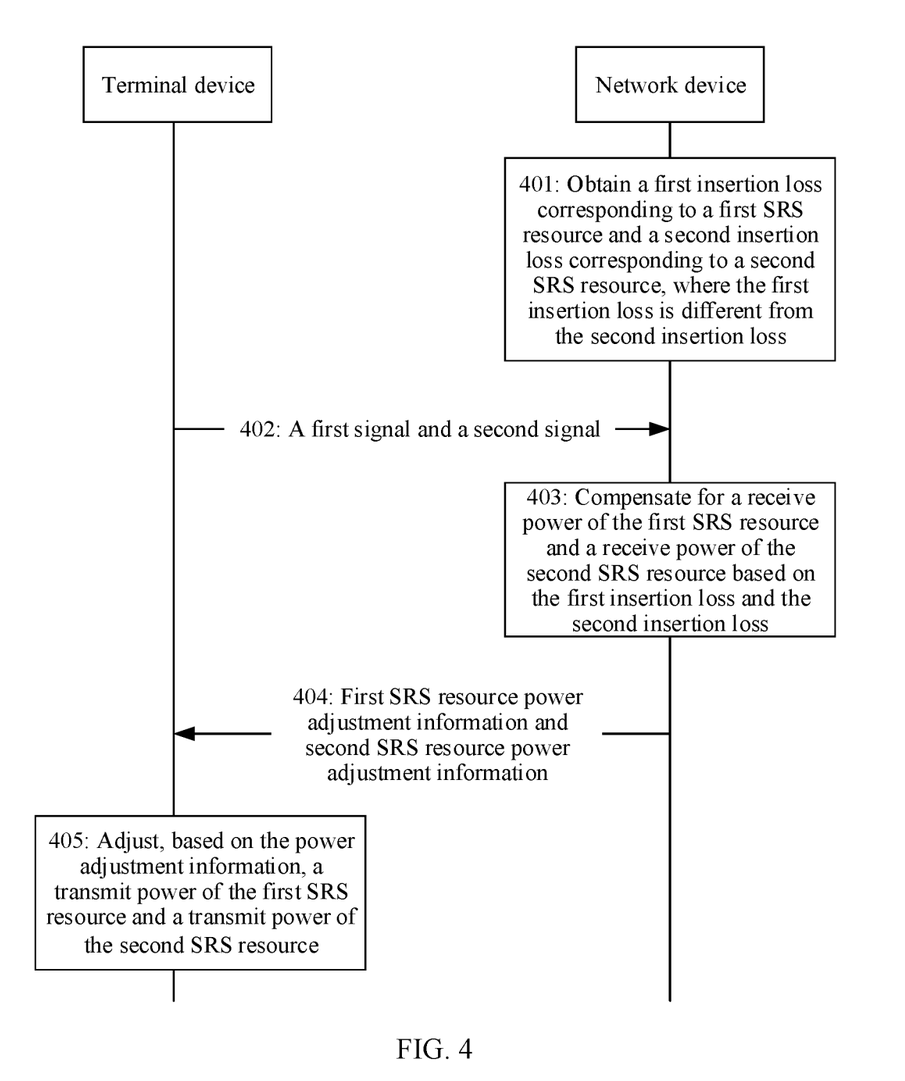
FIG. 4 is a schematic flowchart of another signal sending method and a signal receiving method according to an embodiment of this application.

FIG. 4 is a schematic flowchart of another signal sending method and/or a signal receiving method according to an embodiment of this application, to improve channel measurement precision, and improve demodulation performance.

Step 401: A network device obtains a first insertion loss corresponding to a first SRS resource and a second insertion loss corresponding to a second SRS resource, where the first insertion loss is different from the second insertion loss.

Specifically, the insertion loss corresponding to each SRS resource may be reported by a terminal device to the network device. For example, the terminal device sends first indication information, where the first indication information is used to indicate the first insertion loss and the second insertion loss. Correspondingly, the network device receives the first indication information.

Specifically, the first indication information may report the insertion loss corresponding to each SRS resource, where the insertion loss corresponding to each SRS resource occupies X bits, and X is a positive integer, for example, X is equal to 2 or 3.

In an implementation, the first indication information reports, in a bitmap manner, the insertion loss corresponding to each SRS resource.

In an implementation, the first indication information reports, in a manner of using an insertion loss and an SRS resource index, the insertion loss corresponding to each SRS resource. For example, if the SRS index is 1, a corresponding insertion loss is $\Box T_{RxSRS}(1)$; and if the SRS index is 2, a corresponding insertion loss is $\Box T_{RxSRS}(2)$.

The insertion loss corresponding to each SRS resource may be predefined according to a protocol. The insertion loss corresponding to each SRS resource may alternatively be obtained by the network device from another network device. This is not limited in this application.

By reporting the insertion loss corresponding to each SRS resource, the network device may perform accurate power compensation on the received SRS receive powers, or the network device may control the terminal device to accurately adjust the transmit power on each SRS resource by performing step 306 based on the insertion loss corresponding to each SRS resource.

For descriptions of an SRS resource, an antenna port, an insertion loss and a mapping relationship, refer to the foregoing embodiments. Details are not described herein again.

Step 402: The terminal device sends a first signal on the first SRS resource, and sends a second signal on the second SRS resource. Correspondingly, the network device receives the first signal and the second signal. This step is similar to step 303, and details are not described herein again.

Generally, in this step, the terminal device does not actively compensate for the transmit power of each SRS resource based on the insertion loss corresponding to each SRS resource, but compensate for a receive power in a subsequent step by the network device.

Step 403: The network device compensates for a receive power of the first SRS resource and a receive power of the second SRS resource based on the first insertion loss and the second insertion loss.

Specifically, the network device measures an SRS signal sent by each antenna port to obtain a channel matrix, and performs amplitude or phase adjustment on some elements of the channel matrix based on available $\Box T_{RxSRS}$ information.

Alternatively, the network device may accurately compensate for the receive power of each SRS resource based on the reported insertion loss of each SRS resource. Therefore, channel measurement precision is improved and demodulation performance is improved.

This step is optional.

Step 404: The network device sends signaling, where the signaling is used to indicate to send first power adjustment information of the first signal on the first SRS resource and/or second power adjustment information of the second signal on the second SRS resource. Correspondingly, the terminal device receives the signaling.

Specifically, the network device adjusts the transmit power of each SRS resource based on the insertion loss corresponding to each SRS resource, and may separately send the power adjustment information for the plurality of SRS resources.

For example, the network device obtains information about power imbalance during SRS signal sending on each antenna port based on the $\Box T_{RxSRS}$ information. When scheduling an SRS resource for uplink sending, the network device adjusts, by using a power control command, powers of SRSs sent by different antennas based on the $\Box T_{RxSRS}$, to ensure that the power at each antenna port is as equal as possible.

The signaling may be configured by using higher layer signaling, such as RRC message, a MAC CE, or physical layer signaling. This is not limited in this embodiment of this application. Further, the RRC message may be a dedicated RRC message, or an RRC message shared by a group of UE or all UE, for example, a broadcast message.

This step is optional.

Step 405 is similar to step 306, and details are not described again. This step is optional.

It may be understood that steps 401, 402, and 403 may be separately implemented, to implement an objective of accurately compensating for a receive power of a received signal.

It may be understood that steps 401, 402, 402, and 405 may be separately implemented, to implement an objective of controlling the terminal device to compensate for a transmit power of a sending signal by the network device.

Figure 5:
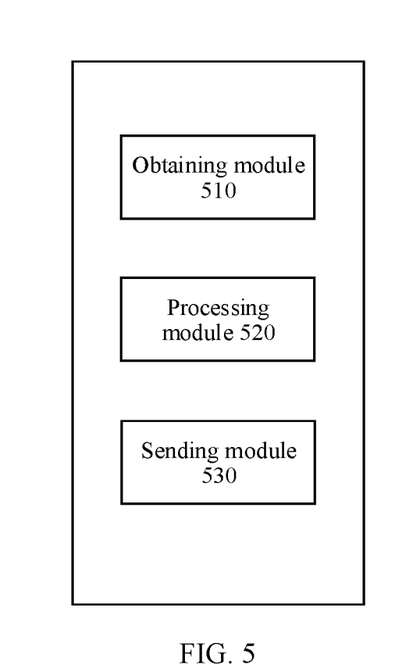
FIG. 5 is a schematic diagram of a structure of a signal sending apparatus according to an embodiment of this application.

As shown in FIG. 5, an embodiment of this application further provides a signal sending apparatus, configured to implement the foregoing reference signal sending method. The signal sending apparatus is disposed on a terminal device 100, and includes an obtaining module 510, a processing module 520, and a sending module 530.

The apparatus may be completely corresponding to the terminal device in the method embodiments shown in FIG. 3, and the apparatus may be the terminal device in the method embodiments, or a chip or a functional module inside the terminal device in the method embodiments. Corresponding units of the apparatus are configured to perform corresponding steps performed by the terminal device in the method embodiments shown in FIG. 3.

Specifically, for example, the obtaining module 510 is configured to perform the signaling receiving actions in step 301 and in step 305;

the processing module 520 is configured to perform step 302 and step 306; and the sending module 530 is configured to perform the sending actions performed by the terminal device in step 303 and in step 304.

The apparatus may be completely corresponding to the terminal device in the method embodiments shown in FIG. 4, and the apparatus may be the terminal device in the method embodiments, or a chip or a functional module inside the terminal device in the method embodiments. Corresponding units of the apparatus are configured to perform corresponding steps performed by the terminal device in the method embodiments shown in FIG. 4.

Specifically, for example, the obtaining module 510 is configured to perform the signaling receiving action in step 404;

the processing module 520 is configured to perform step 405; and the sending module 530 is configured to perform the sending actions performed by the terminal device in step 401 and step 402.

Figure 6:
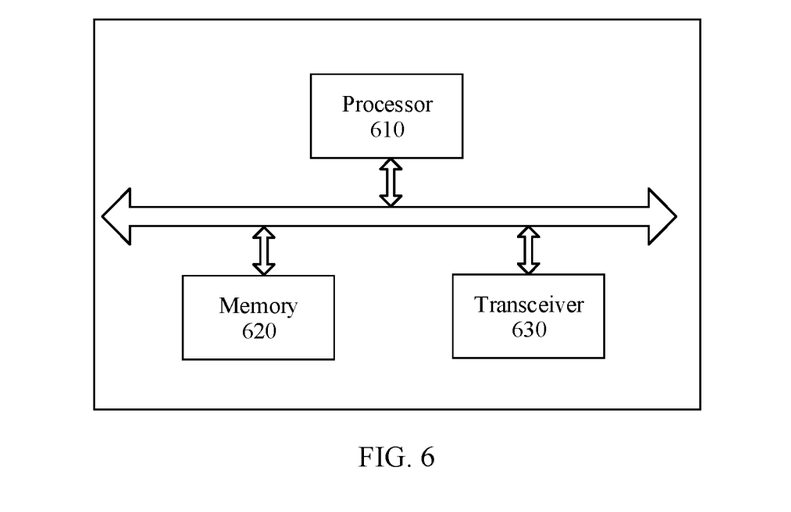
FIG. 6 is a schematic diagram of a structure of a terminal device according to an embodiment of this application.

FIG. 6 is a schematic diagram of a structure of a terminal device applicable to an embodiment of this application. The terminal device may be applied to the system shown in FIG. 1. For ease of description, FIG. 6 shows only main components of the terminal device. As shown in FIG. 6, the terminal device includes a processor (corresponding to the processing module 520 shown in FIG. 5), a memory, and a transceiver (corresponding to the obtaining module 510 and the sending module 530 shown in FIG. 5). The transceiver is configured to transmit and receive a signal, the memory is configured to store a computer program, and the processor is configured to invoke the computer program from the memory and run the computer program, to perform the signal sending method in this application. Details are not described herein again.

A person skilled in the art may understand that for ease of description, FIG. 6 shows only one memory and one processor. In an actual terminal device, there may be a plurality of processors and a plurality of memories. The memory may also be referred to as a storage medium, a storage device, or the like. This is not limited in this embodiment of this application.

Figure 7:
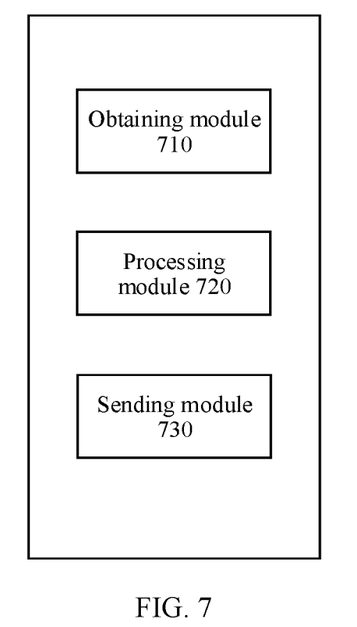
FIG. 7 is a schematic diagram of a structure of a signal sending or receiving apparatus according to an embodiment of this application.

As shown in FIG. 7, an embodiment of this application further provides a signal sending and receiving apparatus, to implement the reference signal sending method and the reference signal receiving method. The signal sending apparatus is disposed on a network device 200, and includes an obtaining module 710, a processing module 720, and a sending module 730.

The apparatus may be completely corresponding to the network device in the method embodiments shown in FIG. 3, and the apparatus may be the network device in the method embodiments, or a chip or a functional module inside the network device in the method embodiments. Corresponding units of the apparatus are configured to perform corresponding steps performed by the network device in the method embodiment shown in FIG. 3.

Specifically, for example, the obtaining module 710 is configured to perform the receiving actions in step 303 and in step 304; and the processing module 720 is configured to perform the action of determining the power adjustment information performed by the network device to generate signaling in step 305.

The sending module 730 is configured to perform the sending action performed by the network device in step 305.

The apparatus may be completely corresponding to the network device in the method embodiments shown in FIG. 4, and the apparatus may be the network device in the method embodiments, or a chip or a functional module inside the network device in the method embodiments. Corresponding units of the apparatus are configured to perform corresponding steps performed by the network device in the method embodiment shown in FIG. 4.

Specifically, for example,
the obtaining module 710 is configured to perform the receiving actions in step 401 and in step 402;
the processing module 720 is configured to perform step 403; and
the sending module 730 is configured to perform the sending action performed by the network device in step 404.

Figure 8:
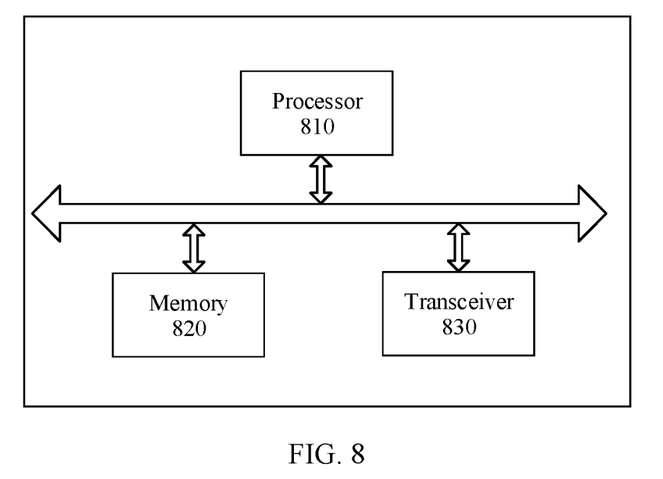
FIG. 8 is a schematic diagram of a structure of a network device according to an embodiment of this application.

FIG. 8 is a schematic diagram of a structure of a network device applicable to an embodiment of this application. The network device may be applied to the system shown in FIG. 1. For ease of description, FIG. 8 shows only main components of the network device. As shown in FIG. 8, the network device includes a processor (corresponding to the processing module 720 shown in FIG. 7), a memory, a transceiver (corresponding to the obtaining module 710 and the sending module 730 shown in FIG. 7). The transceiver is configured to transmit and receive a signal, the memory is configured to store a computer program, and the processor is configured to invoke the computer program from the memory and run the computer program, to perform the signal sending method and the signal receiving method in this application. Details are not described herein again.

A person skilled in the art may understand that for ease of description, FIG. 8 shows only one memory and one processor. In an actual terminal device, there may be a plurality of processors and a plurality of memories. The memory may also be referred to as a storage medium, a storage device, or the like. This is not limited in this embodiment of this application.

An embodiment of this application further provides a communication system, including the foregoing terminal device and the network device.

This application further provides a computer-readable storage medium, where the computer-readable storage medium stores instructions. When the instructions are run on a computer, the computer is enabled to perform steps performed by the terminal device in the methods shown in FIG. 3 and FIG. 4.

This application further provides a computer-readable storage medium, where the computer-readable storage medium stores instructions. When the instructions are run on a computer, the computer is enabled to perform steps performed by the network device in the methods shown in FIG. 3 and FIG. 4.

This application further provides a computer program product including instructions. When the computer program product runs on a computer, the computer is enabled to perform steps performed by the terminal device in the methods shown in FIG. 3 and FIG. 4.

This application further provides a computer program product including instructions. When the computer program product runs on a computer, the computer is enabled to perform steps performed by the network device in the methods shown in FIG. 3 and FIG. 4.

This application further provides a chip, including a processor. The processor is configured to read and run a computer program stored in a memory, to perform corresponding operations and/or procedures performed by the terminal device in the signal sending method and the signal receiving method provided in this application. Optionally, the chip further includes the memory. The memory is connected to the processor through a circuit or a wire, and the processor is configured to read and execute the computer program in the memory. Optionally, the chip further includes a communication interface, and the processor is connected to the communication interface. The communication interface is configured to receive data and/or information that needs to be processed. The processor obtains the data and/or information from the communication interface, and processes the data and/or information. The communication interface may be an input/output interface.

This application further provides a chip, including a processor. The processor is configured to read and run a computer program stored in a memory, to perform corresponding operations and/or procedures performed by the network device in the signal sending method and the signal receiving method provided in this application. Optionally, the chip further includes the memory. The memory is connected to the processor through a circuit or a wire, and the processor is configured to read and execute the computer program in the memory. Optionally, the chip further includes a communication interface, and the processor is connected to the communication interface. The communication interface is configured to receive data and/or information that needs to be processed. The processor obtains the data and/or information from the communication interface, and processes the data and/or information. The communication interface may be an input/output interface.

In this application, the terms "include", "have" and any other variants mean to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

A person of ordinary skill in the art may be aware that, in combination with the examples described in the embodiments disclosed in this specification, units and algorithm steps can be implemented by electronic hardware or a combination of computer software and electronic hardware. Whether the functions are performed by using hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

In addition, the term "and/or" in this application describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may represent the following seven cases: Only A exists, only B exists, only C exists, both A and B exist, both A and C exist, both C and B exist, and A, B, and C exist.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal sending method, wherein the method comprises:
    obtaining a first insertion loss corresponding to a first resource and a second insertion loss corresponding to a second resource, wherein the first insertion loss is different from the second insertion loss, and the second insertion loss is an offset value relative to the first insertion loss;
    determining a first transmit power corresponding to the first resource based on the first insertion loss;
    determining a second transmit power corresponding to the second resource based on the second insertion loss;
    sending a first signal on the first resource based on the first transmit power; and
    sending a second signal on the second resource based on the second transmit power.

2. The method according to claim 1, wherein the method further comprises:
    sending second indication information, wherein the second indication information is used to indicate at least one of:
       the first transmit power is determined based on the first insertion loss; or
       the second transmit power is determined based on the second insertion loss.

3. The method according to claim 1, wherein the method further comprises:
    receiving signaling, wherein the signaling is used to indicate to send at least one of:
       first power adjustment information of a first signal on the first resource; or
       second power adjustment information of a second signal on the second resource; and
    determining a transmit power of at least one of:
       the first signal based on the first power adjustment information; or
       the second signal based on the second power adjustment information.

4. A signal sending method, wherein the method comprises:
    obtaining a first insertion loss corresponding to a first resource and a second insertion loss corresponding to a second resource, wherein the first insertion loss is different from the second insertion loss, and the second insertion loss is an offset value relative to the first insertion loss; and
    sending first indication information, wherein the first indication information is used to indicate the first insertion loss and the second insertion loss.

5. The method according to claim 4, wherein the method further comprises:
    receiving signaling, wherein the signaling is used to indicate to send at least one of:
       first power adjustment information of a first signal on the first resource; or
       second power adjustment information of a second signal on the second resource; and
    determining a transmit power of at least one of:
       the first signal based on the first power adjustment information; or
       the second signal based on the second power adjustment information.

6. A signal sending apparatus, comprising:
    at least one processor; and
    one or more memories coupled to the at least one processor and storing program instructions for execution by the at least one processor to:
       obtain a first insertion loss corresponding to a first resource and a second insertion loss corresponding to a second resource, wherein the first insertion loss is different from the second insertion loss, and the second insertion loss is an offset value relative to the first insertion loss;
       determine a first transmit power corresponding to the first resource based on the first insertion loss, and determine a second transmit power corresponding to the second resource based on the second insertion loss; and send a first signal on the first resource based on the first transmit power, and send a second signal on the second resource based on the second transmit power.

7. The signal sending apparatus according to claim 6, wherein the one or more memories store the program instructions for execution by the at least one processor to:
send second indication information, wherein the second indication information is used to indicate at least one of:
the first transmit power is determined based on the first insertion loss; or
the second transmit power is determined based on the second insertion loss.

8. The apparatus according to claim 6, wherein the one or more memories store the program instructions for execution by the at least one processor to:
receive signaling, wherein the signaling is used to indicate to send at least one of:
first power adjustment information of a first signal on the first resource; or
second power adjustment information of a second signal on the second resource; and
determine a transmit power of at least one of:
the first signal based on the first power adjustment information; or
the second signal based on the second power adjustment information.

9. A signal sending apparatus, comprising:
at least one processor; and
one or more memories coupled to the at least one processor and storing program instructions for execution by the at least one processor to:
obtain a first insertion loss corresponding to a first resource and a second insertion loss corresponding to a second resource, wherein the first insertion loss is different from the second insertion loss, and the second insertion loss is an offset value relative to the first insertion loss; and
send first indication information, wherein the first indication information is used to indicate the first insertion loss and the second insertion loss.

10. The apparatus according to claim 9, wherein the one or more memories store the program instructions for execution by the at least one processor to:
receive signaling, wherein the signaling is used to indicate to send at least one of:
first power adjustment information of a first signal on the first resource; or
second power adjustment information of a second signal on the second resource; and
determine a transmit power of at least one of:
the first signal based on the first power adjustment information; or
the second signal based on the second power adjustment information.

11. A non-transitory computer readable storage medium, wherein the non-transitory computer readable storage medium stores program instructions for execution by at least one processor to:
obtain a first insertion loss corresponding to a first resource and a second insertion loss corresponding to a second resource, wherein the first insertion loss is different from the second insertion loss, and the second insertion loss is an offset value relative to the first insertion loss;

determine a first transmit power corresponding to the first resource based on the first insertion loss;
determine a second transmit power corresponding to the second resource based on the second insertion loss;
send a first signal on the first resource based on the first transmit power; and
send a second signal on the second resource based on the second transmit power.

12. The non-transitory computer readable storage medium according to claim 11, wherein the non-transitory computer readable storage medium stores the program instructions for execution by the at least one processor to:
send second indication information, wherein the second indication information is used to indicate at least one of:
the first transmit power is determined based on the first insertion loss; or
the second transmit power is determined based on the second insertion loss.

13. The non-transitory computer readable storage medium according to claim 11, wherein the non-transitory computer readable storage medium stores the program instructions for execution by the at least one processor to:
receiving signaling, wherein the signaling is used to indicate to send at least one of:
first power adjustment information of a first signal on the first resource; or
second power adjustment information of a second signal on the second resource; and
determining a transmit power of at least one of:
the first signal based on the first power adjustment information; or
the second signal based on the second power adjustment information.

14. A non-transitory computer readable storage medium, wherein the non-transitory computer readable storage medium stores program instructions for execution by at least one processor to:
obtain a first insertion loss corresponding to a first resource and a second insertion loss corresponding to a second resource, wherein the first insertion loss is different from the second insertion loss, and the second insertion loss is an offset value relative to the first insertion loss; and
send first indication information, wherein the first indication information is used to indicate the first insertion loss and the second insertion loss.

15. The non-transitory computer readable storage medium according to claim 14, wherein the non-transitory computer readable storage medium stores the program instructions for execution by the at least one processor to:
receiving signaling, wherein the signaling is used to indicate to send at least one of:
first power adjustment information of a first signal on the first resource; or
second power adjustment information of a second signal on the second resource; and
determining a transmit power of at least one of:
the first signal based on the first power adjustment information; or
the second signal based on the second power adjustment information.

* * * * *